Dec. 22, 1970     H. E. WILLINGHAM     3,549,506
METHOD OF MAKING AN ELECTROCONDUCTIVE ROLLER
Filed Nov. 5, 1968     4 Sheets-Sheet 1
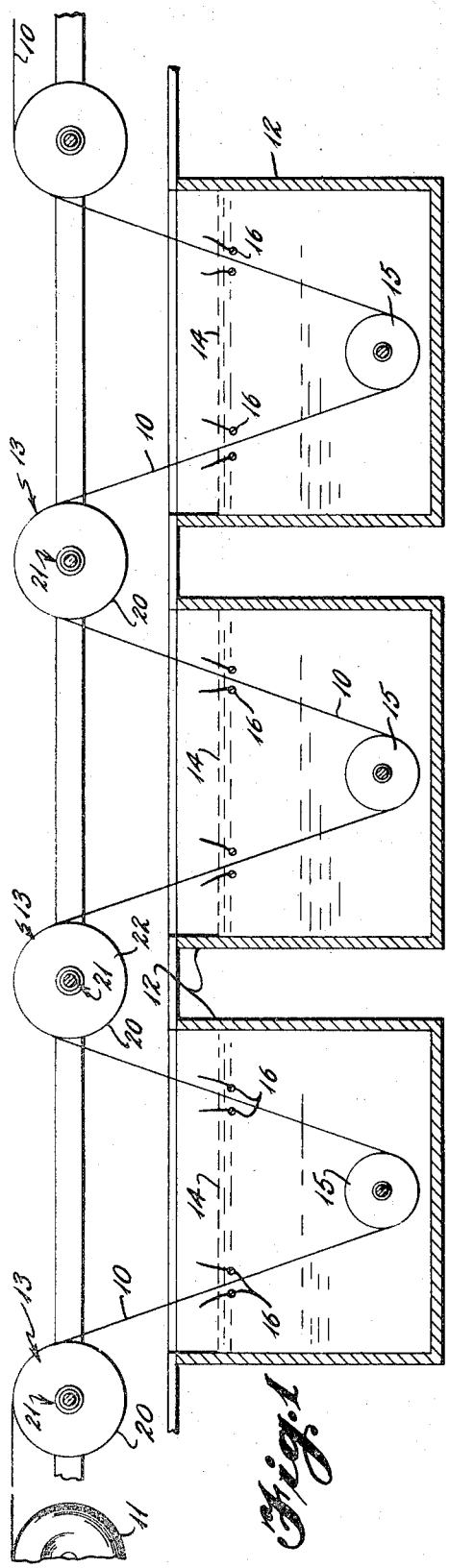
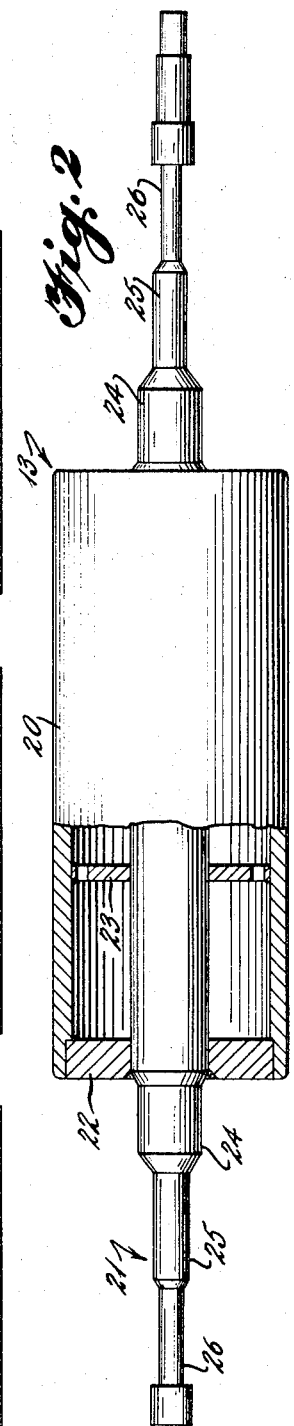
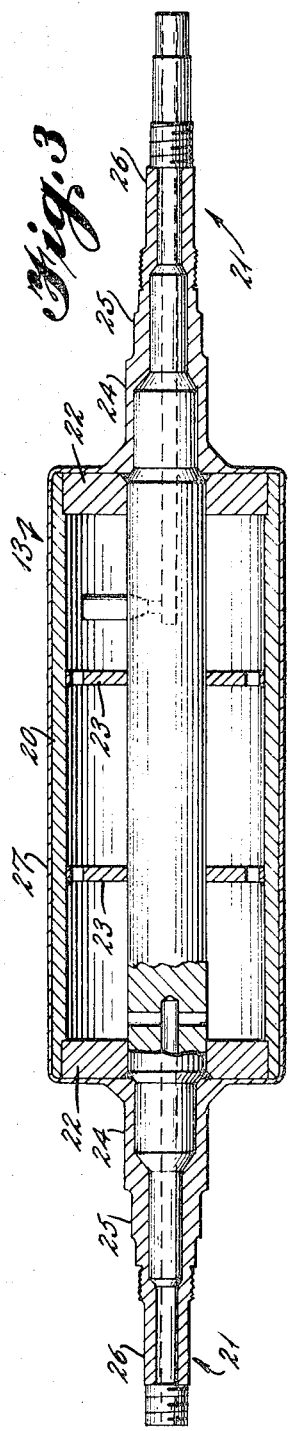
INVENTOR
HAROLD E. WILLINGHAM
BY
ATTORNEYS Dec. 22, 1970   H. E. WILLINGHAM   3,549,506
METHOD OF MAKING AN ELECTROCONDUCTIVE ROLLER
Filed Nov. 5, 1968                                    4 Sheets-Sheet
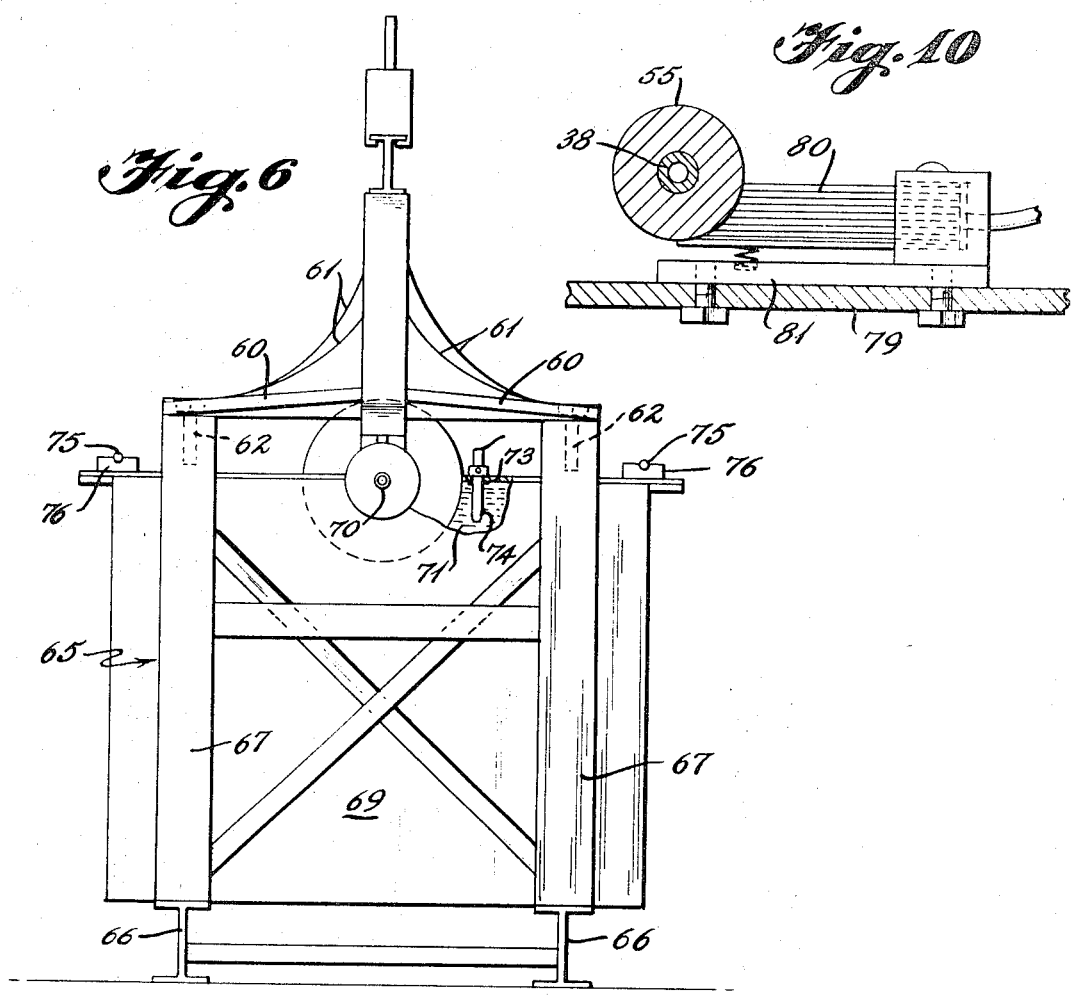
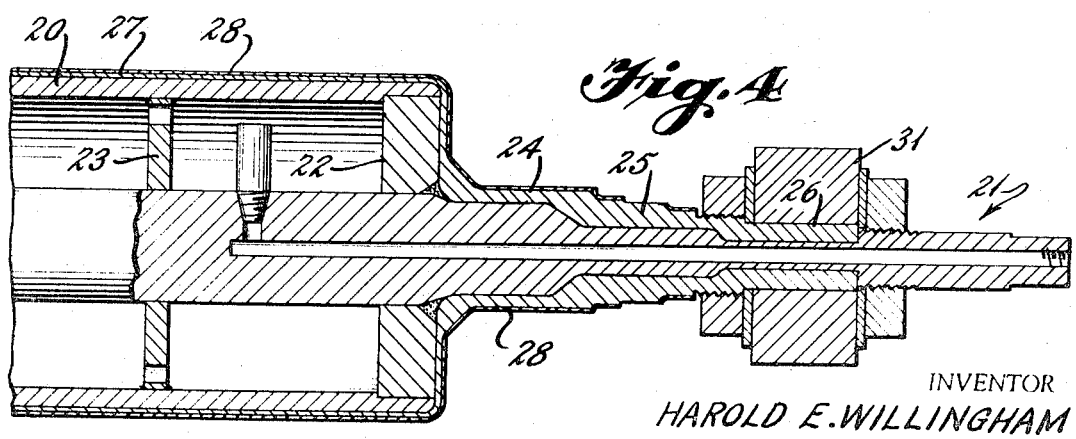
INVENTOR
HAROLD E. WILLINGHAM
BY
ATTORNEYS

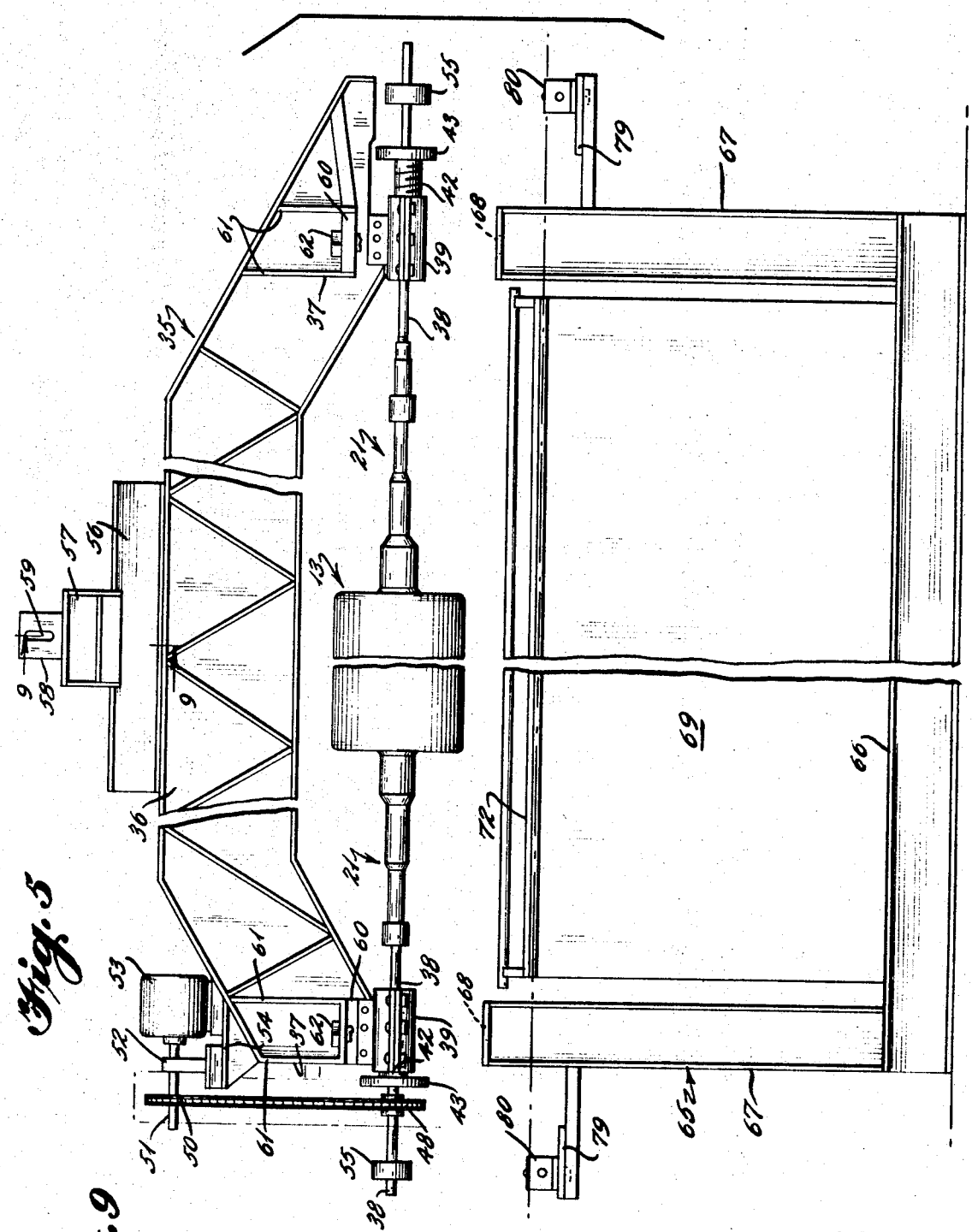

Dec. 22, 1970 H. E. WILLINGHAM 3,549,506
METHOD OF MAKING AN ELECTROCONDUCTIVE ROLLER
Filed Nov. 5, 1968 4 Sheets-Sheet 4
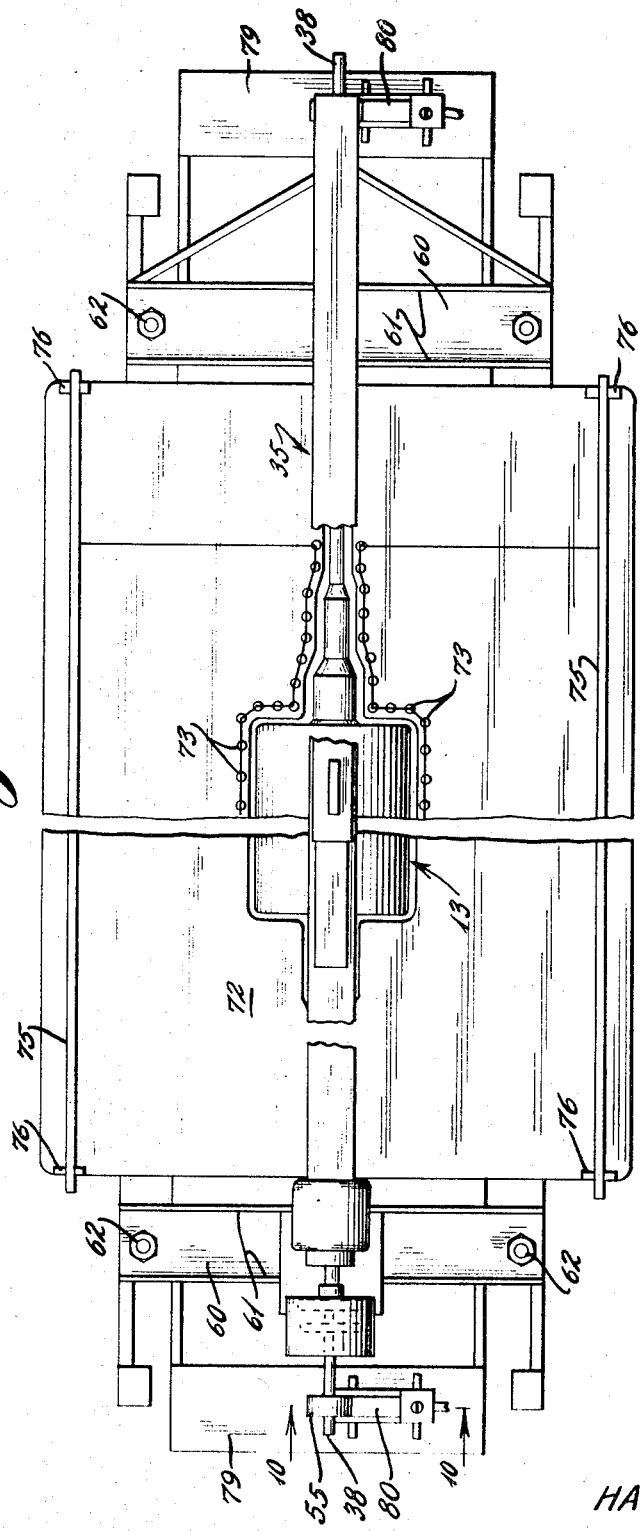
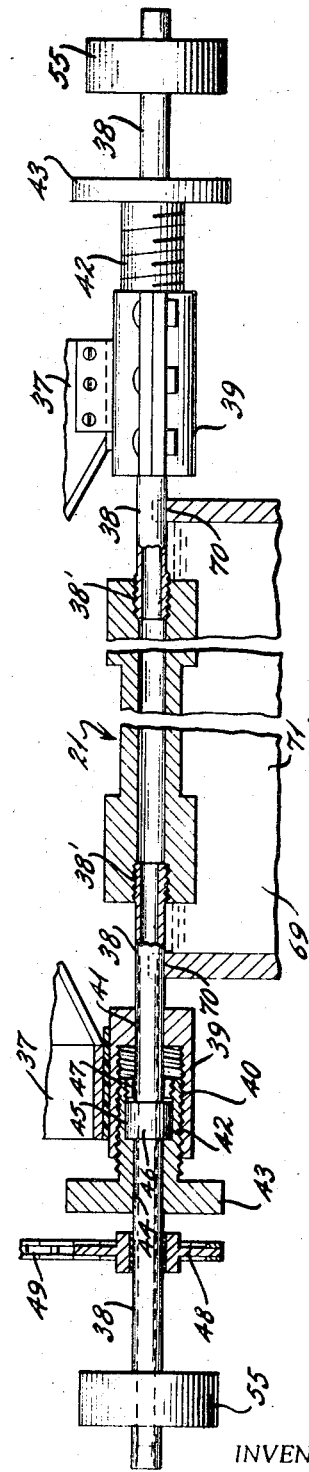
INVENTOR
HAROLD E. WILLINGHAM
BY
ATTORNEYS United States Patent Office 3,549,506
Patented Dec. 22, 1970

3,549,506
METHOD OF MAKING AN ELECTRO-
CONDUCTIVE ROLLER
Harold E. Willingham, Sky Drive,
Anniston, Ala. 36201
Filed Nov. 5, 1968, Ser. No. 773,602
Int. Cl. B01k 3/02; C23b 5/56, 5/78
U.S. Cl. 204—25                                3 Claims

ABSTRACT OF THE DISCLOSURE

An electrical current-carrying and transferring apparatus having multiple diameters and method of making the same with varying thicknesses of conductor material on the several diameters in accordance with the amount of energy conducted and the total area of conducting material.

BACKGROUND OF THE INVENTION (1) Field of the invention

This invention relates generally to apparatus utilized in the coating of a moving strip of material by electrodeposition, and relates particularly to the apparatus and method of making an electroconductive roller capable of carrying and transferring large amounts of electrical energy to a moving strip of material passing through an electrolyte adjacent to anode so that such strip will be plated.

(2) Description of the prior art

Heretofore many electroconductive rollers have been provided for transferring electrical energy to a moving strip of material being electroplated including rollers which have been cast of copper or other material having high electroconductivity, steel rollers which have been copper clad, and steel rollers which have had a layer of copper welded thereon, as well as the application of a coating of copper on a steel roller by electrodeposition. These prior rollers have not been entirely satisfactory for many reasons including lack of strength particularly to support the torque developed at the beginning of rotation, have been expensive due to the excessive amount of copper which has been used to insure that the current-carrying capacity of the roller is sufficient, and when a layer of copper has been welded on a steel roller, the intermixing of the materials has reduced the carrying capacity of the copper and has caused warpage of the steel due to the intense heat involved in the welding process.

SUMMARY OF THE INVENTION

The present invention resides in an electroconductive roller having a hollow steel body fixed on a shaft for strength and such body and the exposed portions of the shaft are coated by electrodeposition with varying thicknesses of a current-carrying material such as copper or the like to insure sufficient capacity for the desired flow of electrical energy. The portions of smaller diameter or less total surface area are provided with a greater thickness of current-carrying material than the portions of greater diameter so that the current-carrying capacity of the roller will be substantially equal throughout its length and regardless of varying diameters of the roller. Also the inventive concept includes the method and apparatus by which the roller is constructed in a minimum of time and with minimum labor while maintaining the cost as low as possible.

It is noted that the layer of copper should be in a substantially pure state so that the electroconductive qualities are not impaired. In order to apply the copper in its pure state, such copper normally is applied by electrodeposition because welding of the copper onto the steel usually results in fusion or combining of the metals due to the heat generated in the welding process. The fusion of the metals drastically reduces the current-carrying capacity of the copper so that more copper is required to transmit a predetermined amount of electrical energy. Also casting of the copper body requires thicknesses in excess of the amount of copper actually needed to transmit the required current.

It is an object of the invention to provide an electroconductive roller having varying thicknesses of current-carrying material in direct proportion to the surface area and the amount of electrical energy to be applied.

Another object of the invention is to provide a method of making an electroconductive roller by electrodepositing varying thicknesses of a current-carrying material on a strong body to combine strength with the desired amount of current-carrying material.

A further object of the invention is to provide apparatus by which an electroconductive roller can be made with minimum expense including both labor and materials.

BRIEF DESCRIPTION OF THE DRAWINGS

FIG. 1 is a schematic illustrating one application of the invention.

FIG. 2 is a side elevation of the electroconductive roller prior to the application of the conductor material.

FIG. 3 is a vertical section of the roller with the conducting material applied.

FIG. 4 is an enlarged fragmentary cross-section of one end of the roller after a protective coating has been applied.

FIG. 5 is an exploded side elevation of the apparatus used in the electrodeposition of the roller.

FIG. 6 is an end view of the electroplating apparatus in assembled relation.

FIG. 7 is a top plan view of the structure of FIG. 6.

FIG. 8 is an enlarged fragmentary section of the roller mounting apparatus.

FIG. 9 is an enlarged section on the line 9—9 of FIG. 5, and

FIG. 10 is an enlarged section on the line 10—10 of FIG. 7.

DESCRIPTION OF THE PREFERRED EMBODIMENTS

With continued reference to the drawings, a strip of metal or other material 10 of indeterminate length is formed in a coil 11 and is placed at one end of an electroplating tank or series of tanks 12 so that a coating material such as zinc, tin, aluminum or other material can be applied thereto by electrodeposition. In the plating process the strip 10 engages a charged electroconductive roller 13 which transfers an electrical charge of approximately 8,000 to 10,000 amps at 15 volts to the strip. Such strip is then immersed in an electrolyte 14 contained within the tank 12 by passing beneath a roller 15 of rubber or the like located within the tank 12 and then back to another electroconductive roller. One or more anodes 16, to which an opposite electrical charge has been applied, are suspended within the electrolyte so that a current will flow between the charged strip 10 which functions as a cathode and the anode 16 in the presence of the electrolyte and cause material therein to be deposited on the strip.

The roller 13 includes a generally cylindrical body 20 mounted on a shaft 21 in any desired manner, as by end plates 22 and one or more intermediate spacers 23. Normally the ends of the shaft 21 which project outwardly of the body 20 have several portions 24, 25 and 26 of stepped reduced diameters for a purpose to be described later. The entire outer periphery of the body 20 is coated with a layer of copper or other electrical conducting material 27 of any desired thickness, although a thickness of approximately ⅛ inch has been found satisfactory.

The portions of the shaft 21 which project outwardly of the cylindrical body 20 likewise are coated with a layer of copper or other conducting material. As illustrated best in FIG. 4, the layer of copper 27 on the stepped portions 24, 25 and 26 is substantially thicker than the layer on the body 20 in order to transmit the required current of electrical energy and the layer of copper on each of the stepped portions is slightly different depending upon the total surface area of the particular portion. As a general rule of thumb, it is normally estimated that a cubic inch of copper is required to carry each thousand amps of electrical energy. In the present application with 8,000 to 10,000 amps of energy being carried by the layer of copper 27, and with half of the energy being applied to each end of the shaft 21, the thickness of the layer of copper on each of the stepped portions can be determined. As an example, if the portion 26 is 6 inches in diameter, approximately ⅜ of an inch of copper should be applied to the shaft which would then be capable of carrying a maximum of 7,000 amps. It is noted that the smaller the diameter is, the greater the thickness of the copper layer will have to be in order to carry the same amount of electrical energy.

After the copper has been applied, a layer of chromium or other hard material 28 may be applied to the copper to protect the same.

In the use of the roller, the shaft 21 is supported by bearings on opposite sides thereof. Electrical energy is supplied to the roller 13 through commutators 31 carried by the outermost reduced portion 26 from an electrical generator or other source of supply (not shown). When the strip 10 passes over the body 20 of the roller 13, the electrical energy will be transferred to the strip so that when the strip passes through the tanks 12 and the electrolyte 14, an electric charge will pass between the anodes 16 and the strip 10 which will cause material suspended within the electrolyte to be deposited upon the strip.

In the preparation of the roller 13, the shaft 21 is provided of a diameter sufficient to impart the necessary strength to the structure and then both ends of such shaft are machined to provide the stepped portions 24, 25 and 26. Thereafter the body 20 which normally has an outside diameter of either 18 inches or 24 inches is disposed about the shaft 21 and connected thereto by welding end plates 22 and spacers 23 in position. At this point the roller 13 may be heat treated to relieve any internal stresses caused by the welding process and may be dynamically balanced. Thereafter a strongback or supporting member 35 is connected to the roller 13 in a manner to support the same.

The strongback 35 includes a central portion 36 with a downwardly extending end portion 37 connected to each end thereof. An adjustable rotatable spindle 38 is mounted on the lower extremity of each of the end portions 37 and such spindles are adjustable toward and from each other and are freely rotatable in adjusted position, the other end 38' of each being threadedly received within the ends of shaft 21.

In order to adjustably and rotatably mount spindles 38 on the strongback 35, a support block 39 is secured to each of the end portions 37 through an electrical insulator, and such support block is provided with a threaded recess 40 concentrically arranged with a reduced bore 41. A threaded plug 42 is received within the recess 40 and is adapted to be locked in adjusted position in any desired manner as by a jam nut 43. The plug 42 has an axial bore 44 with an enlarged concentric counterbore 45 at one end. The axial bore 44 is of a size to freely rotatably receive the spindle 38, and the counterbore 45 is of a size to slidably receive a collar 46 fixed to such spindle. A cap 47 may be mounted in the end of the plug 42 to retain the collar 46 in position. With this construction the spindle 38 is freely rotatably carried by the plug 42 and such plug is adjustable relative to the support block 39 to move the spindles axially.

It is desirable to rotate the roller 13 while the layer of copper 27 is being applied by electrodeposition, and in order to do this one of the spindles 38 has a sprocket 48 fixed thereto and such sprocket is driven by a chain 49 from a drive sprocket 50 mounted on a shaft 51 of a gear reduction 52 which in turn is driven by a motor 53. As illustrated in FIG. 5 the motor and gear reduction are mounted on a platform 54 fixed to the strongback 35. At least one enlarged commutator 55 is mounted on the outer end of each of the spindles 38 for engagement with electrical brushes to transmit an electric current to the roller as will be described later.

In order to lift the strongback 35 with the roller 13 connected thereto, an I-beam 56 is welded or otherwise attached to the top of the strongback 35 and an adjustable lift member 57 is slidably mounted on the upper flange of the I-beam 56. The lift member 57 is shiftable on the beam 56 to equally distribute the weight of the strongback and the roller on both sides of the lift member 57 so that the strongback can be raised by a single lifting device. The lift member 57 has an upstanding tab 58 with an opening 59 therein for the reception of the hook of an overhead crane or other lifting device (not shown). If desired the adjustable lifting member 57 may have a set screw or other means (not shown) for connecting the same in fixed position relative to the I-beam 56 after it has been adjusted.

In order to support the strongback 35 and roller 13 during the electroplating process, a laterally extending plate 60 extends outwardly from each side of each of the end portions 37 and are braced by gussets 61 to add strength to the plates. Adjacent to the outer end of each of the plates 60 a downwardly extending pin 62 is provided for locating and supporting the strongback 35 on the frame 65 of an electroplating tank unit.

The frame 65 includes a base 66 with a pair of upstanding posts 67 mounted at each end thereof. Each of the posts 67 has a socket or recess 68 in the upper surface for the reception of the pins 62.

A tank 69 is mounted on the base 66 between the posts 67 and such tank is provided with an arcuate recess 70 in the upper surface of each end for the reception of spindles 38 of the strongback 35 when the roller 13 is in position to be electroplated. An electrolyte 71 containing copper or other current-carrying material in suspension is disposed within the tank 69 with the liquid level located slightly below the arcuate recesses 70.

In order to cause the conducting material suspended within the electrolyte 71 to be deposited on the roller 13, the tank 69 has a divided top 72 extending inwardly from the sides of the tank to a position spaced slightly from the roller 13 when the roller is in position. The inner edge of each half of the divided top generally follows the contour of the roller 13. A plurality of spaced electrically insulated openings 73 are disposed adjacent to the inner edge of each half of the top 72 and each of such openings is adapted to removably receive an anode 74 which will extend downwardly to a point where it will be immersed in the electrolyte 71. Each of the anodes 74 is connected electrically to a bus bar 75 mounted on insulators 76 at each side of the tank 69. The bus bars 75 are supplied with a positive charge of electrical energy from any desired source (not shown).

It is noted that although a solid top 72 with a plurality of openings therein has been illustrated, it is contemplated that the top could be of an open mesh or other configuration, it being necessary only to provide a support for a plurality of independent anodes adjacent to the roller 13.

At each end of the frame 65 an outwardly extending platform 79 is provided and such platform forms a support for one or more brushes 80 for the reception of the commutators 55 mounted on spindles 38. Each of the brushes 80 is supplied with a negative electrical charge from any desirable source of supply (not shown). If desired the brushes 80 may be mounted on an adjustable base 81 so that the brushes may be adjusted along the platform 79 to coincide with the location of the commutators 55 carried by the axially adjustable spindles 38. Preferably the brushes 80 are spring-loaded upwardly to make certain that a good electrical contact is made between the brushes and the commutators 55.

In the operation of the device the shaft 21 is first machined to the desired diameters and thereafter the body 20 is placed in position about the shaft and the spacers 23 and end plates 22 are welded or otherwise attached in position, after which the roller is heat treated to relieve any internal stresses caused by the welding process and preferably is dynamically balanced. Thereafter an overhead crane or other lifting device will move the strongback 35 into position over the roller 13. The threaded plugs 42 then are rotated to cause the spindles 38 to move toward the roller 13 until they firmly engage such roller. If desired one end of the shaft 21 can be provided with a recess having a righthand thread and the other end provided with a recess having a lefthand thread for complementary engagement with right and lefthand threads on the ends of the spindles 38. The threads in the ends of the shaft 21 and the spindles 38 are counter to the direction of rotation of the motor 53 so that the spindles cannot be accidentally displaced during rotation of the roller in the electrodeposition process.

After the roller has been mounted on the spindles 38, the strongback 35 is again raised so that the roller can be transported to the tank 69. Prior to the lowering of the strongback with the pins 62 in engagement with the sockets 68 of the frame 65, the motor 53 is started so that the roller will be rotating at a desired number of r.p.m.'s when the body 20 and shaft 21 of the roller 13 are immersed within the electrolyte 71. A positive electric charge is supplied to the anodes 74 and as soon as the strongback lowers the roller 13 into position a negative electrical charge will be established between the commutators 55 and the brushes 80 so that electrical energy can flow from the anodes to the roller 13 which functions as a cathode. The motor 53 continues to rotate the roller 13 while the coating of current-carrying material is being deposited on the exterior surfaces of the roller. After a predetermined thickness of material has been deposited on the body 20, the anodes 74 in the area of the body are deactivated, either by removing the anodes from the insulated openings 73 or by interrupting the flow of current to such anodes by switch means or the like. The motor 53 continues to rotate the roller 13 while current continues to flow to the remaining anodes and thereby continues to electrically deposit current-carrying material onto portions of the roller. After each successive portion of the shaft 21 has been provided with a sufficient amount of current-carrying material, the anodes in the immediate vicinity are deactivated while certain other anodes continue to function. After the desired coating has been applied to the entire length of the roller 13, the strongback 35 again is lifted so that the roller is removed from the tank 69, after which the roller is placed in a lathe and machined to the proper diameters.

Since it is conventional for nodules or trees to grow unevenly during the electrodeposition process, it is contemplated that the roller 13 can be removed one or more times from the electrolytic bath during the electrodeposition process for the purpose of rough machining to keep the current-carrying material as even as possible.

After the current-carrying material has been deposited on the roller and has been machined to the desired diameters, the roller again is placed within the strongback 35 so that the roller is again placed within an electrolytic bath. This time the electrolytic bath contains chromium, nickel or other hard metal 28 which is then applied thereto as a protective coating. Thereafter a plurality of rollers 13 are placed above the tank 12 in a position to receive the strip 10. Electrical energy is supplied to the rollers through the brushes 31 so that such energy can be transmitted from the current-carrying material 27 of the roller through the layer of chromium 28 to the strip 10.

I claim:

1. The method of making an electroconductive roller comprising the steps of providing an elongated cylindrical body having a shaft extending outwardly from each end thereof, providing a tank having an electrolyte therein in which is suspended a current-carrying material, at least partially immersing said roller in said electrolyte, applying electrical energy to said roller while the roller is rotating, locating a plurality of deactivatable anodes in the electrolyte and adjacent to said roller, applying a source of electrical energy to each of said anodes so that the current-carrying material will adhere to said roller by electrodeposition, continuing to rotate said roller until a predetermined thickness of material has been deposited thereon, deactivating the anodes from certain areas of said tank, continuing to rotate said roller so that the electrodeposition process will continue to plate certain areas of said roller until a second predetermined thickness of electroconductive material has been deposited on certain portions of said roller, and removing said roller from the electrolyte, whereby varying thicknesses of electroconductive material will be applied to different areas of said roller.

2. The method of claim 1 including the additional step of machining said roller to provide a smooth surface after the electrodeposition coating has been applied.

3. The method of claim 2 including the additional step of electroplating a protective covering on said current-carrying material.

References Cited

UNITED STATES PATENTS

| | | | |
|---|---|---|---|
| 1,526,644 | 2/1925 | Pinney | 204—231 |
| 2,652,461 | 9/1953 | Klein | 204—279 |
| 2,958,742 | 11/1960 | Palmer | 204—279 |
| 3,347,770 | 10/1967 | Valles et al. | 204—231 |

ROBERT K. MIHALEK, Primary Examiner

T. TUFARIELLO, Assistant Examiner

U.S. Cl. X.R.

191—1; 204—218, 231, 279